Figure 1:
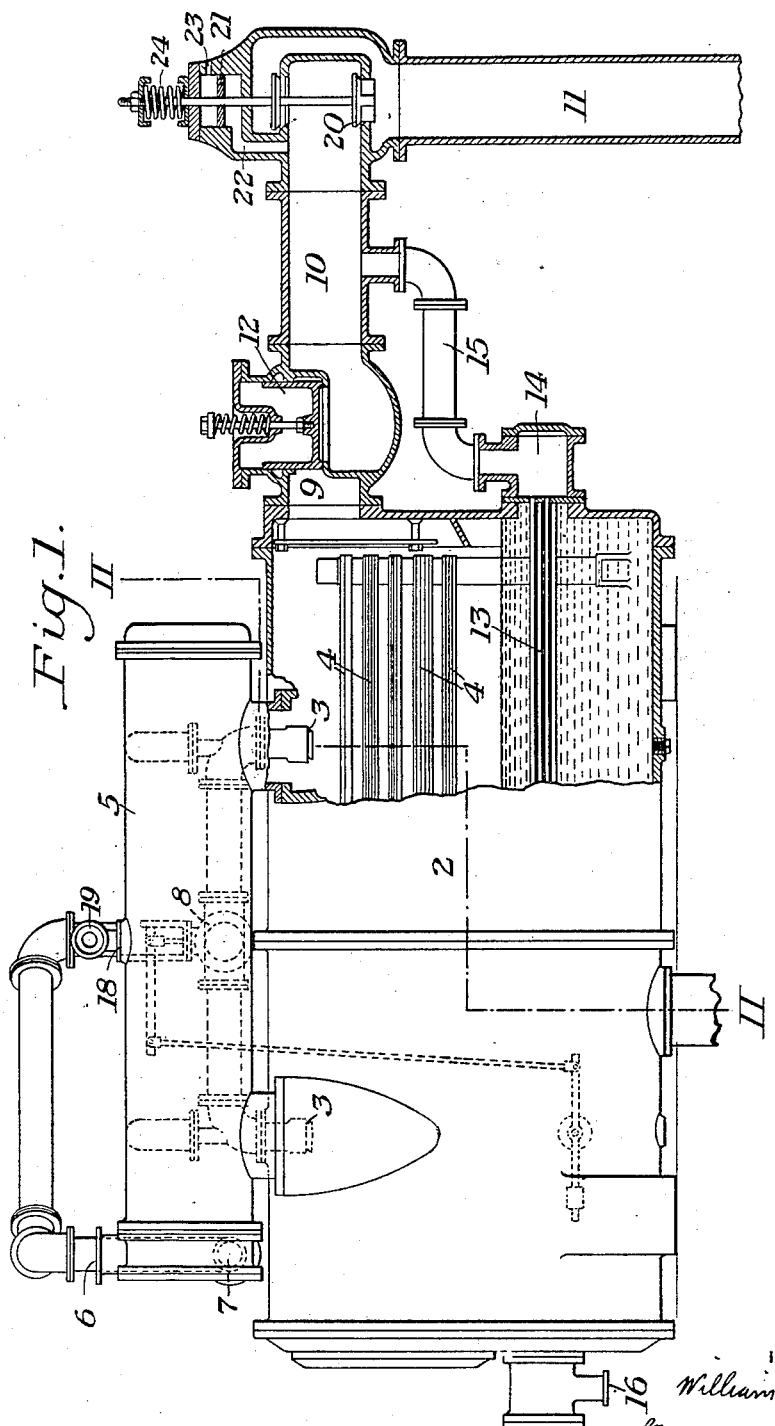

April 14, 1931.  W. S. ELLIOTT  1,800,723
LIQUID TREATING APPARATUS AND METHOD OF TREATING LIQUIDS
Filed Feb. 12, 1924   2 Sheets-Sheet 1

INVENTOR
William S. Elliott,

April 14, 1931. W. S. ELLIOTT 1,800,723
LIQUID TREATING APPARATUS AND METHOD OF TREATING LIQUIDS
Filed Feb. 12, 1924  2 Sheets-Sheet 2

INVENTOR
William S. Elliott

Patented Apr. 14, 1931

1,800,723

UNITED STATES PATENT OFFICE

WILLIAM S. ELLIOTT, OF PITTSBURGH, PENNSYLVANIA

LIQUID-TREATING APPARATUS AND METHOD OF TREATING LIQUIDS

Application filed February 12, 1924. Serial No. 692,244.

The present invention relates, broadly, to heat exchange apparatus for the treatment of liquids, and more particularly to methods and apparatus of this character particularly adapted for deaerating water.

It is highly desirable, as recognized in the art, to effect the separation from water of as much of the air and other contained gases as possible, particularly where the water is to be used in power plant equipment or apparatus requiring a heat exchanging operation. In this manner the corrosive property of the water is minimized in accordance with the degree of air separation or oxygen removal, and the scale and encrustation forming properties are likewise greatly reduced.

In my Patent, No. 1,457,153, of May 29, 1923, I have disclosed one means of effecting the desired release of air by changing the phase of a definite percentage of the liquid. I have found that in this manner very desirable and uniform results are obtained. Such an operation requires the continuous evaporation of a sufficient quantity of the liquid being treated to insure the release therefrom of the contained vapors and gases. One of the objects of the present invention is to provide another means for insuring such temperature conditions that a constant evaporation or change in phase of the desired amount of liquid will take place.

In the accompanying drawings there is shown, more or less diagrammatically, for purposes of illustration only, one embodiment of the present invention, it being understood that the drawings do not define the limits of the invention and that changes may be made in the construction and operation disclosed therein without departing from the spirit of the invention or scope of my broader claims.

In the drawings:—

Figure 2:
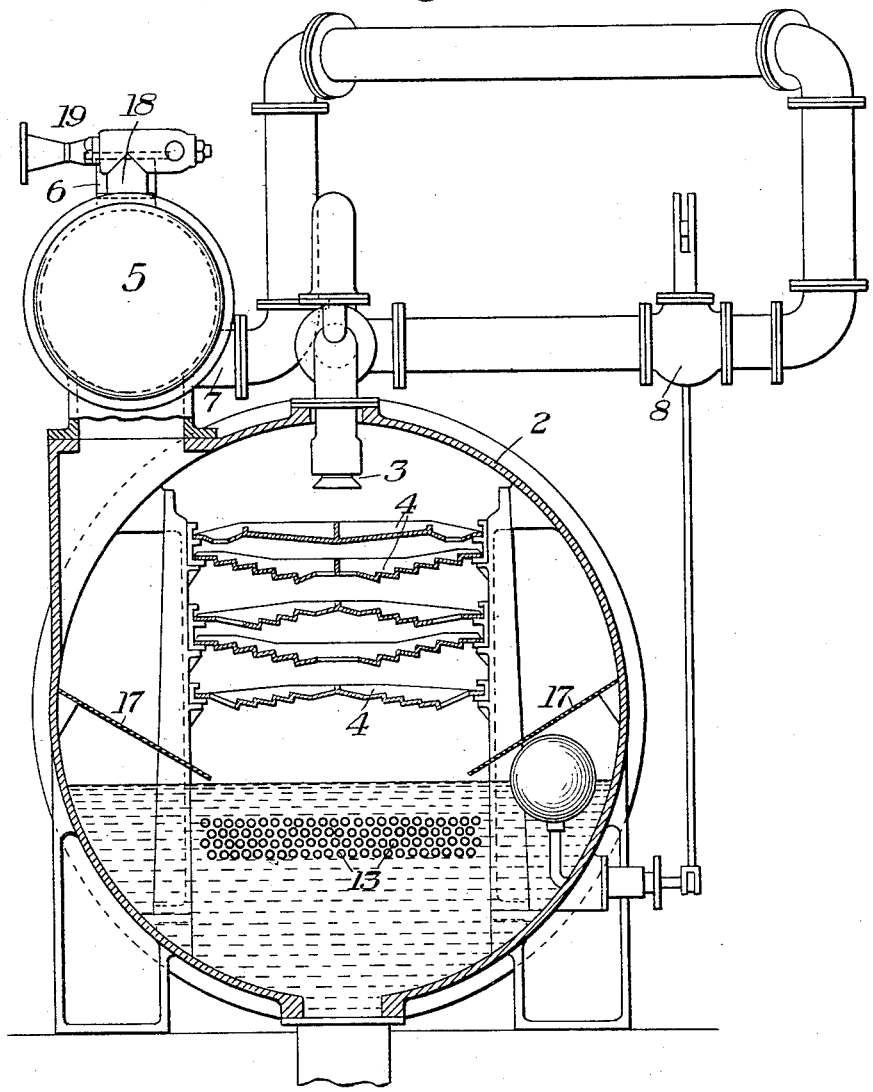

Figure 1 is a diagrammatic side elevation, partly broken away, illustrating one embodiment of the invention, and Figure 2 is a vertical transverse sectional view on the line II—II of Figure 1 looking in the direction of the arrows.

In the illustrated embodiment of the invention there is provided a feed water heater 2 of the open type having in its upper portion one or more inlets 3 for the liquid to be treated. This liquid is adapted to be supplied to the chamber of the heater under definite pressure conditions as well understood in the art. Upon its entry into the chamber, the liquid is caused to flow in cascade over a series of agitating pans 4 whereby it is effectively broken up to facilitate partial release therefrom of air and gases and to permit the more rapid heating thereof. This liquid may conveniently be supplied to the heater through a condenser 5 having the usual inlet 6 and having its outlet 7 connected to the inlet of the feed water heater. Also, as is customary in this art, the supply of liquid may be automatically controlled in accordance with the requirements on the apparatus for air free or substantially air free liquid, by providing a float operated valve 8 actuated by the liquid level within the heater.

Heating steam for the entering liquid may be supplied through a steam inlet 9 fed by a manifold 10 which, in turn, receives its supply from a live or exhaust steam inlet 11. The passage of steam from the manifold 10 to the inlet 9 is controlled by a differentially unbalanced valve 12 whereby the quantity of heating steam at the inlet 9 may vary with respect to the steam pressure in the manifold 10. The valve will preferably be so set, however, that the steam pressure in the inlet 9, and consequently the temperature, will be less than the corresponding pressure and temperature in the manifold 10, and for best results, not less than the temperature maintained in the heater chamber.

Located below the agitating pans 4, and preferably in such position that they will normally be submerged below the liquid level in the heater, are tubes 13 adapted to constitute a second heating means. These tubes, at one end, may be connected to a header 14 adapted to have heating steam supplied thereto from the manifold 10 by means of a connection 15. By properly setting the valve 12, it will be apparent that the steam temperature and pressure in the tubes 13 may be higher than the temperature and pressure in the inlet 9, and likewise the temperature within the heater 2. Condensate formed within the tubes 13 may be withdrawn through a suitable condensate outlet 16, which outlet also functions to prevent the tubes from becoming air bound by the continuous condensation of steam therein.

In order to obtain the most efficient heat transfer between the previously agitated liquid and the tubes 13, it is desirable to provide means for insuring the passage of this liquid in contact with the tubes. For this purpose there may be provided on each side of the apparatus longitudinally extending downwardly inclined baffles 17 serving to direct all of the liquid into the zone occupied by the tubes.

In some cases, it may be desirable to operate the heater at a temperature corresponding to a pressure which is below atmospheric pressure. In such cases the condenser 5 will tend to withdraw the released vapors and gases from the heater 2 and will thereby maintain the desired thermal conditions within the heater. It will be understood that the particular design of the condenser may be much in accordance with conditions under which it is desired to operate the heater. Noncondensible gases may be withdrawn from the condenser through the outlet 18 in any desired manner, as by an ejector 19. By utilizing such a condenser not only are the desired thermal conditions maintained within the heater, but the sensible heat of any vapors and gases released therein is conserved and imparted to the incoming liquid for partially preheating the same. When operating under substantially atmospheric pressure conditions the ejector 19 may be omitted and the condenser vented directly to the atmosphere.

When operating a heater under sub-atmospheric conditions, it will be obvious that there may exist within the manifold 10 a steam pressure which is also sub-atmospheric. As the present state of the art dictates the advisability of maintaining steam supply lines under a pressure which is at least atmospheric, in order to prevent the infiltration of air, it is undesirable to have such pressure conditions within the manifold 10 transmitted to the steam supply 11. In order to prevent such a condition within the steam supply line, there may be provided a balanced valve structure 20 having a piston or diaphragm 21 subjected on one side to atmospheric pressure through the port 23 and on the other side to manifold pressure through a passage 22. The manifold pressure may be adjustably augmented by a loading spring 24, whereby the desired operating conditions of the valve are insured. In this manner atmospheric or sub- atmospheric conditions may be maintained in the steam supply line 11 irrespective of the conditions existing within the heater 2 and the manifold 10.

With contemplated developments in the art, the use of a balanced valve in the steam supply line may be rendered unnecessary as the supply of steam at sub-atmospheric pressures may be made possible. It will be understood, therefore, that while such a valve is both necessary and desirable in certain installations, the operation of the present apparatus is not necessarily dependent thereon in certain cases.

In actual operation, the temperature conditions maintained within the heater 2 by steam supplied through the inlet 9 will preferably be such that the liquid is raised substantially to its boiling point at the pressure obtaining within the heater. Thereafter this liquid is subjected to the action of the second heating means provided, which heating means is at a higher temperature sufficient to cause the evaporation of a definite percentage of the liquid being treated to thereby cause the release therefrom of the contained vapors and gases. This evaporation or change in phase of a definite percentage of the liquid causes the release of vapors and gases and consequently the dissipation of a certain amount of heat within the heater. By reason of the provision of the condenser, however, the heat dissipated in this manner is recovered and serves to preheat the liquid in the condenser prior to its entry into the heating chamber.

The deaerated liquid may be drawn from the apparatus to the point of use through a suitable outlet 25 which may be connected with a pump or other means, not shown, for positively withdrawing the liquid.

In some cases it may be desired to supply steam to the heating chamber from an independent source perhaps having a lower pressure than that supplied to the tubes 13. Such a source might conveniently be a lower turbine stage from which the steam could be bled at will. In such cases, the differential pressure valve 12 could be omitted entirely, and separate supply lines provided.

The advantages of the present invention arise from the provision of a compact apparatus which may be economically operated to effect the release and removal of dissolved air and other gases from liquid by first heating the liquid to a predetermined temperature and thereafter further heating the same to produce a change in phase of a sufficient percentage of the liquid to effect the removal therefrom of the air and other gases.

I claim:

1. In apparatus for separating gases from liquids, a chamber, means for supplying thereto the liquid to be degasified, agitating means over which the liquid is adapted to flow, means for supplying heating steam to the chamber for heating the liquid by direct contact therewith while being agitated, tubes constituting a closed heater below said agitating means, and pressure responsive means for supplying steam to said tubes at a temperature higher than the temperature in the chamber.

2. In apparatus for separating gases from liquids, a chamber, means for supplying thereto the liquid to be degasified, agitating means over which the liquid is adapted to flow, means for supplying heating steam to the chamber for heating the liquid while being agitated, tubes below said agitating means, pressure responsive means for supplying steam to said tubes at a temperature higher than the temperature in the chamber, and a condenser for recovering the heat released in said chamber.

3. An apparatus for separating gases from liquids, comprising a chamber, means for supplying to said chamber the liquid to be degasified, agitating means over which the liquid is adapted to flow, heating tubes below said agitating means, and closed to said chamber, pressure responsive means for supplying to said tubes steam at a temperature above that of the space occupied by said agitating means, and other means for maintaining a steam atmosphere in said chamber.

4. An apparatus for separating gases from liquids, comprising a chamber, means for supplying to said chamber the liquid to be degasified, agitating means over which the liquid is adapted to flow, heating tubes below said agitating means and closed to said chamber, pressure responsive means for supplying to said tubes steam at a temperature above that of the space occupied by said agitating means, and means effective for recovering the heat of the vapors leaving said chamber and imparting the same to the liquid before delivery thereto.

5. An apparatus for separating gases from liquids, comprising a chamber, means for supplying to said chamber the liquid to be degasified, agitating means over which the liquid is adapted to flow, heating tubes below said agitating means and closed to said chamber, means for supplying to said tubes steam at a temperature above that of the space occupied by said agitating means, and pressure responsive means for supplying to said chamber steam at a temperature below that in said tubes.

6. Deaerating apparatus comprising a containing shell, means for normally maintaining a body of liquid in the lower portion of said shell, means for admitting incoming liquid above said body of liquid and allowing it to fall under the influence of gravity into the lower portion of the shell, a heating element submerged in the liquid within said shell, means for supplying heating steam to said element, means for supplying heating steam to the said containing shell above the liquid level therein and pressure responsive means for maintaining a temperature differential between said submerged heating element and the space within said shell whereby ebullition of the said liquid body is insured.

7. In apparatus for separating gases from liquids, a chamber, tubes therein, a steam supply line delivering steam to said chamber and said tubes, pressure responsive means controlling the steam from said line to said chamber to insure a reduction in pressure between the steam in the tubes and the steam in the chamber, and means for passing liquid first to said chamber and then to the zone containing said tubes.

In testimony whereof I have hereunto set my hand.

WILLIAM S. ELLIOTT.